E. H. BEAUDREAU.
AUTOMOBILE NON-SKID CHAIN.
APPLICATION FILED SEPT. 6, 1918.
1,327,369.
Patented Jan. 6, 1920.
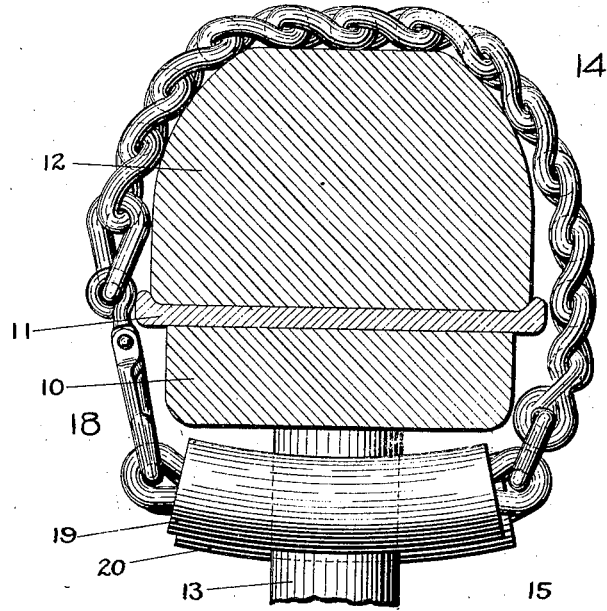
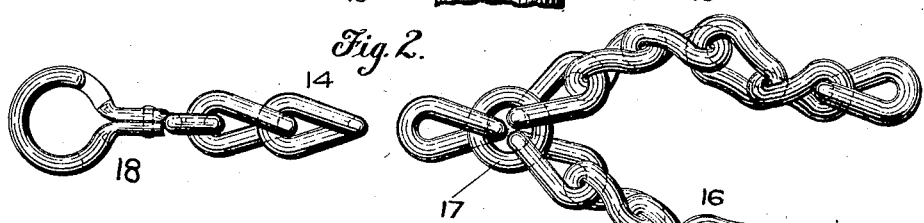
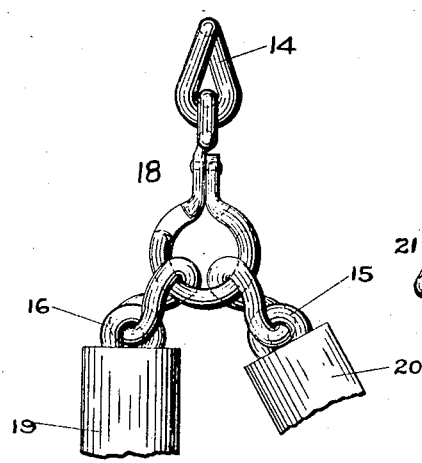
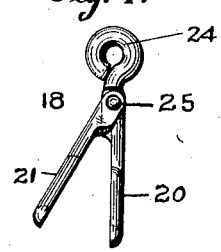
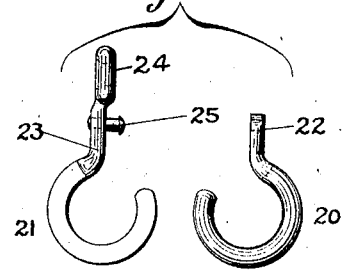
Inventor
Edward H. Beaudreau
By Henry E. Rockwell
Attorney

UNITED STATES PATENT OFFICE.

EDWARD H. BEAUDREAU, OF MERIDEN, CONNECTICUT, ASSIGNOR TO AMERICAN TOOL COMPANY, OF MERIDEN, CONNECTICUT, A CORPORATION OF CONNECTICUT.

AUTOMOBILE NON-SKID CHAIN.

1,327,369.   Specification of Letters Patent.   Patented Jan. 6, 1920.

Application filed September 6, 1918. Serial No. 252,873.

*To all whom it may concern:*

Be it known that I, EDWARD H. BEAUDREAU, a citizen of the Unitel States, residing in the city of Meriden, in the county of New Haven and State of Connecticut, have invented certain new and useful Improvements in Automobile Non-Skid Chains, of which the following is a full, clear, and exact description.

This invention relates to chains or antislipping attachments for automobile wheels, or the like, such as are commonly called non-skid chains, and which are used to prevent the wheels of an automobile from skidding or slipping, and for increasing the traction of the wheels on the ground.

The primary object of my invention is to provide a non-skid chain with strong and durable means for retaining the same in place upon the tread of a wheel, which retaining means is very simple in construction, may be easily and inexpensively manufactured, and which is so constructed that a chain provided with my securing means may be very easily and quickly secured to and removed from a wheel.

Another object of my invention is to provide a non-skid chain with securing means, all the parts of which are permanently secured together, and which securing means in turn is permanently secured to the non-skid chain, so that there are no loose parts to become lost or misplaced.

Still another object of my invention is to provide securing means for a non-skid chain, which is so constructed that it will be practically impossible for the chain to become unfastened while in use from the wheel upon which it is mounted.

To these and other ends, the invention consists in the novel features and combinations of parts to be hereinafter described and claimed.

In the accompanying drawing,

Figure 1 is a sectional view of a portion of an automobile wheel having my invention applied thereto;

Fig. 2 is a view of my device shown removed from the wheel, some of the links having been omitted from the chain to conserve space;

Fig. 3 is a front view of the safety hook which is secured to one end of the non-skid chain, portions of the chain which engage the safety hook being shown in their operative position;

Fig. 4 is a detail view of the safety hook, showing the hook portions of the same swung to the open position; and Fig. 5 is a detail view of the safety hook, showing one hook member completely removed from the other.

In the drawing, I have shown the preferred embodiment of my invention applied to an automobile wheel having a solid tire, it being obvious, however, that my novel device may equally as well be applied to an automobile wheel provided with a pneumatic tire. The wheel partially shown in the drawing consists of a felly 10, provided with a tire-receiving rim 11, having a solid rubber tire 12 mounted thereupon, one of the spokes with which the wheel is provided being designated by the numeral 13.

Automobiles are commonly provided with what are known as "non-skid chains", which are designed to be applied to the tread of the wheels in order to prevent slipping and skidding, and to increase the traction between the wheel and the ground, these chains being practically indispensable when the automobile is to be driven through mud or deep snow, since unless some means is provided for increasing the traction between the wheels and the ground, the driving wheels of the automobile will spin around without propelling the automobile forward. Although these chains are practically indispensable when an automobile is to be driven over bad roads, it is very undesirable to use them when not needed, since they injure the tires and interfere with the smooth running of the car, as the car is jolted considerably each time one of these chains contacts with the ground. It is, therefore, extremely desirable to provide strong durable means by which chains of the type herein described may be quickly mounted upon and removed from the wheels upon which they are to be used, and also that the securing means be so constructed that the non-skid chain will be retained in the desired position upon the wheel, and will be prevented from becoming accidentally unfastened from the same and lost.

The device hereinafter more fully described for securing a chain upon the tread of a tire it is believed meets the above mentioned conditions in a very desirable manner.

Referring to the drawing, I have designated by the numeral 14 a non-skid chain, the same being simply a strip of chain of the desired length composed of any preferred type of links. To one end of the chain 14 are permanently secured a pair of relatively short flexible members 15 and 16, these flexible members consisting preferably of a pair of short chains of the same general construction as the chain 14, and are permanently secured to one end of the chain 14 by any preferred means, such as a ring 17, which passes through the end link of each of the chains 14, 15 and 16. Upon the other end of the chain 14 is permanently secured means which I have designated in its entirety by the numeral 18, for removably securing the free ends of the relatively short flexible members 15 and 16 to the free end of the chain 14. The short flexible securing means or chains 15 and 16 are designed to pass around the opposite sides of the spoke 13 so that when the free ends of these two chains are secured to the free end of the chain 14, after the same has been placed about the tread of the tire upon which it is to be used, it will be seen that the chain 14 is strongly secured in place upon the wheel, and that the same is prevented from creeping about the tread of the tire, due to the fact that the flexible members or chains 15 and 16 straddle one of the spokes of the wheel, and thereby retain the chain 14 in its proper position. In order to prevent the chains or the like 15 and 16 from injuring the paint upon the spoke 13 and inner face of the felly 10, I preferably provide these chains with a relatively soft covering, such as leather or rubber tubes 19 and 20, through which the chains 15 and 16 are passed, it being obvious that any desired means may be provided for this purpose, and if desired the same may be omitted, since the omission of the protective devices 19 and 20 will in no way interfere with the proper operation of my device except that it will injure the face of the wooden spokes and felly to a more or less extent.

The preferred embodiment of the securing means 18 consists of what I term a "safety hook," the same being constructed of a pair of similar hook portions 20 and 21, each of which is curved somewhat in the form of the letter C, and each of which is semi-circular in cross-section, as will be seen from a careful inspection of Fig. 4 of the drawing. The hook portion 20 is provided with a relatively short shank 22 extending radially therefrom, and the hook portion 21 is provided with a similar shank 23, upon the outer end of which is formed the eye 24 by means of which my safety hook 18 may be permanently secured to one end of the chain 14, as will be apparent. The hook portions 20 and 21 are pivotally secured together by means of a rivet 25, so that they face in opposite directions. The rivet 25 passes through the shanks 22 and 23 in a direction substantially parallel to the lateral faces of the hook portions 20 and 21, the parts of the safety hook 18 being so constructed that when the members 20 and 21 are moved angularly to each other, as shown in Fig. 4, the free ends of the chains or the like 15 and 16 may be hooked over the members 20 and 21 and then moved rearwardly upon these hooks toward the shanks a sufficient distance to permit the hook portions 20 and 21 to be swung to the closed position shown in Figs. 1, 2 and 3. The end links of the chains may then be moved to the position shown in Fig. 3, whereupon practically a closed ring consisting of the hook portions 20 and 21 is provided, which passes through the links upon one end of the chains 15 and 16, as shown in Fig. 3. When it is desired to remove the chain 14 from the wheel, this may be done easily and quickly by inserting a knife blade, screw driver or similar instrument between the adjacent faces of the hook members 20 and 21 in order to force them apart, as shown in Fig. 4, sufficiently to permit the chains 15 and 16 to be unhooked therefrom.

From the above description, when read in connection with the drawing, it is believed the construction of the means herein disclosed for securing a non-skid chain to a wheel will be clearly understood, and it will be apparent that my securing means is extremely simple in construction, and that a chain provided with this type of securing means may be very quickly and easily applied to and removed from a wheel, since when it is desired to mount such a chain upon a wheel all that is necessary is to throw the device herein described across the tread of the wheel so that the safety hook 18 lies adjacent the outside face of the wheel. The flexible members 15 and 16 may then be drawn through the wheel adjacent the inner face of the felly, so that one of these chains 15 and 16 will lie upon each side of the spoke 13, and then the free ends of these chains may be readily secured to my safety hook device 18 in the manner above set forth. The hook portions 20 and 21 are so constructed that a pull exerted upon the same by the chains or the like 15 and 16 will retain the adjacent flat faces of the hook portions in contact with each other. It is therefore extremely unlikely that the device herein described will become accidentally unfastened from the wheel upon which it is mounted.

Although I have disclosed the hook 18 as a preferred means for securing the ends of the short chains 15 and 16 to the tread chain 14, it will be apparent that various other means may be provided for this purpose without departing from the scope of my invention as defined in the claims. Furthermore, it will be obvious that a non-skid chain of the type herein disclosed may be applied to wheels provided with either pneumatic or solid tires of various sizes, and that the same is not limited in its use to wheels provided with a single tire.

What I claim is:

1. An anti-slipping attachment for wheels, comprising a non-skid chain, a pair of relatively short chains permanently secured to one end of said chain, and a single fastening device permanently secured upon the other end of said non-skid chain for detachably securing the free ends of said short chains thereto, said pair of chains arranged to straddle one of the spokes of the wheel, whereby said non-skid chain is prevented from creeping about the wheel upon which it is mounted but releasable from the wheel by disengaging said fastening device.

2. An anti-slipping attachment for wheels, comprising a chain, a pair of relatively short members secured to one end of said chain, and a safety hook secured to the other end thereof for attaching the free ends of said members thereto, said safety hook provided with means retained in place by said free ends for closing the entrance to said hook, whereby the flexible members are prevented from escaping therefrom.

3. An anti-slipping attachment for wheels, comprising a chain, a pair of relatively short chains secured to one end of said chain, and a safety hook secured to the other end of said first mentioned chain for attaching the free ends of said short chains thereto, said safety hook provided with means for closing the entrance to said hook constructed to be retained in closing position by the ends of the chains engaging said hook.

4. An anti-slipping attachment for automobile wheels, comprising a chain for engaging the tread of a wheel, and means for securing said chain in place thereupon, comprising a pair of relatively short chains each permanently connected at one end to one end of said first mentioned chain, said short chains arranged to straddle a spoke of the wheel, whereby said first mentioned chain is prevented from creeping about the wheel upon which it is mounted, and a retaining device on the other end of said first mentioned chain engageable with the free ends of said pair of chains to hold them detachably in place.

5. A non-skid chain for automobile wheels, and means for securing said chain in place upon the tread of a wheel, comprising a pair of spoke engaging members, each having a portion permanently secured to the same end of said chain, and a safety hook on the other end of said chain for removably securing the free ends of said spoke engaging members thereto.

6. A non-skid attachment for wheels, comprising a flexible member adapted to be positioned across a tire, a pair of spoke engaging members, means for permanently fastening an end of each of said spoke engaging members to said flexible member at substantially the same point on said flexible member, and a fastening device permanently secured to the end of said flexible member remote to this connection with said spoke engaging members for securing the free ends of said spoke engaging members detachably to said flexible member.

7. A non-skid attachment for vehicle wheels, comprising a flexible member adapted to be laid across a tire, a pair of members secured to one end of said flexible member and adapted to be positoned across the felly, and a fastening device on the free end of said flexible member for securing the free ends of said other members to said flexible member, having a movable retaining member held in position by said felly engaging members when the device is mounted on the wheel.

8. An anti-slipping attachment for automobile wheels, comprising a chain for engaging the tread of a wheel, and means for securing said chain in place thereupon, comprising a pair of relatively short flexible members each permanently connected at one end to one end of said chain, said flexible members arranged to straddle a spoke of the wheel, whereby said chain is prevented from creeping about the wheel upon which it is mounted, and a retaining device on the other end of said chain engageable with the free ends of said flexible members to hold them detachably in place.

9. An anti-slipping attachment for automobile wheels, comprising a chain for engaging the tread of a wheel, and means for securing said chain in place thereupon, comprising a pair of relatively short flexible members each permanently connected at one end to one end of said chain, said flexible members arranged to straddle a spoke of the wheel, whereby said chain is prevented from creeping about the wheel upon which it is mounted, and a single retaining device for detachably securing the free end of said chain to the free ends of said flexible members.

In witness whereof, I have hereunto set my hand on the 3rd day of Sept., 1918.

EDWARD H. BEAUDREAU.